(12) United States Patent
Li

(10) Patent No.: US 10,149,342 B2
(45) Date of Patent: Dec. 4, 2018

(54) METHOD FOR RECONSTRUCTING AND RECOVERING CLUSTER COMMUNICATION SYSTEM BASED ON LTE AND USER TERMINAL

(71) Applicant: ZTE CORPORATION, Shenzhen (CN)

(72) Inventor: Bo Li, Shenzhen (CN)

(73) Assignee: XI'AN ZHONGXING NEW SOFTWARE CO., LTD (CN)

( * ) Notice: Subject to any disclaimer, the term of this patent is extended or adjusted under 35 U.S.C. 154(b) by 0 days.

(21) Appl. No.: 15/317,453

(22) PCT Filed: Sep. 18, 2014

(86) PCT No.: PCT/CN2014/086871
§ 371 (c)(1),
(2) Date: Mar. 24, 2017

(87) PCT Pub. No.: WO2015/188497
PCT Pub. Date: Dec. 17, 2015

(65) Prior Publication Data
US 2017/0208645 A1    Jul. 20, 2017

(30) Foreign Application Priority Data

Jun. 10, 2014 (CN) .......................... 2014 1 0256178

(51) Int. Cl.
*H04W 76/19* (2018.01)
*H04W 36/08* (2009.01)
(Continued)

(52) U.S. Cl.
CPC ......... *H04W 76/19* (2018.02); *H04L 41/0803* (2013.01); *H04W 36/08* (2013.01);
(Continued)

(58) Field of Classification Search
None
See application file for complete search history.

(56) References Cited

U.S. PATENT DOCUMENTS

| | | | |
|---|---|---|---|
| 2008/0102896 A1* | 5/2008 | Wang | H04W 60/04 455/560 |
| 2010/0124203 A1* | 5/2010 | Tenny | H04W 36/24 370/331 |

(Continued)

FOREIGN PATENT DOCUMENTS

| | | |
|---|---|---|
| CN | 103067864 | 4/2013 |
| CN | 103220629 | 7/2013 |

(Continued)

OTHER PUBLICATIONS

Extended European Search Report for European Application No. EP 1494276.6, Completed by the European Patent Office, dated Mar. 30, 2017, 7 Pages.

(Continued)

*Primary Examiner* — Kathy Wang-Hurst
*Assistant Examiner* — Ernest Tacsik
(74) *Attorney, Agent, or Firm* — Plumsea Law Group, LLC

(57) ABSTRACT

A method for reestablishing and recovering a LTE-based trunking communication system is described. The method includes: monitoring first resource configuration information of a serving cell and second resource configuration information of a neighbor cell, configuring the user terminal according to the first resource configuration information to allow access of the user terminal serving as a trunking listening user, and storing the second resource configuration information; the user terminal establishing an RRC link and a service bearer with the network side; when detecting abnormality of a radio link, the user terminal determining a target cell in the service cell and the neighbor cell, and (Continued)

sending a reestablishment request to the target cell, such that the target cell initiates a reestablishment process to recover a common service or both a common service and a trunking speaking user service, and recover a trunking listening user service according to the second resource configuration information.

8 Claims, 5 Drawing Sheets

(51) Int. Cl.
    *H04W 76/27*     (2018.01)
    *H04L 12/24*     (2006.01)
    *H04W 68/02*     (2009.01)
    *H04W 84/04*     (2009.01)
    *H04W 88/02*     (2009.01)

(52) U.S. Cl.
    CPC ........... *H04W 68/02* (2013.01); *H04W 76/27* (2018.02); *H04W 84/042* (2013.01); *H04W 88/02* (2013.01)

(56) References Cited

U.S. PATENT DOCUMENTS

| | | | |
|---|---|---|---|
| 2011/0080825 A1* | 4/2011 | Dimou | H04J 11/0086 370/216 |
| 2011/0105074 A1 | 5/2011 | Wu | |
| 2013/0294330 A1 | 11/2013 | Kim et al. | |
| 2013/0322325 A1 | 12/2013 | Hahn et al. | |
| 2014/0073335 A1* | 3/2014 | Panchal | H04W 4/00 455/450 |
| 2014/0286225 A1* | 9/2014 | Yu | H04W 4/08 370/312 |
| 2015/0296481 A1 | 10/2015 | Yu et al. | |
| 2015/0312944 A1 | 10/2015 | Yu et al. | |
| 2015/0319774 A1* | 11/2015 | Cai | H04W 72/14 370/329 |
| 2016/0044064 A1* | 2/2016 | Pison | H04W 4/10 370/312 |
| 2016/0119762 A1* | 4/2016 | Zhu | H04W 72/042 370/312 |

FOREIGN PATENT DOCUMENTS

| | | |
|---|---|---|
| CN | 103228015 | 7/2013 |
| WO | 2014067306 | 5/2014 |
| WO | 2014067307 | 5/2014 |

OTHER PUBLICATIONS

International Search Report for PCT/CN2014/086871, English Translation attached to original, Both completed by the Chinese Patent Office on Feb. 7, 2015, All together 5 Pages.

* cited by examiner

METHOD FOR RECONSTRUCTING AND RECOVERING CLUSTER COMMUNICATION SYSTEM BASED ON LTE AND USER TERMINAL

CROSS-REFERENCE TO RELATED APPLICATION

This application is the U.S. national phase of PCT Appln. No. PCT/CN2014/086871 filed Sep. 18, 2014, which claims priority to Chinese Application No. 201410256178.2 filed Jun. 10, 2014, the disclosures of which are incorporated in their entirety by reference herein.

TECHNICAL FIELD

The present document relates to the field of communications, and more particularly to a method for reestablishing and recovering a Long Term Evolution (LTE)-based trunking communication system and a user terminal.

BACKGROUND ART

At present, a trunking communication system such as an LTE-based trunking communication system is widely applied to the fields of government departments, public security, emergency communications, electric power, civil aviation, petrochemical industry, armed forces, and the like. Therefore, in order to meet application demands of this trunking communication system, a system where a common service and a trunking service are concurrent (e.g., an LTE-based system where the common service and the trunking service are concurrent) emerges in the market.

At present, firstly, in a trunking communication system supporting concurrence of the common service and the trunking service (e.g., an LTE-based trunking communication system where the common service and the trunking service are concurrent), when the common service is executed, communications between user terminals have a Radio Resource Control (RRC) link, the trunking service is a half-duplex bidirectional service, a trunking user terminal is constructed to belong to a certain group of user terminals in a certain given area, in a communication process, any member in the group may become a speaker, but only one speaker, namely a calling trunking user terminal, is allowed at any time while others are listeners, namely called trunking user terminals, the calling trunking user terminal has an RRC link, and the called trunking user terminals do not have RRC links; secondly, a service concurrence situation in the trunking communication system supporting concurrence of the common service and the trunking service includes: 1, concurrent execution of the common service and a trunking listening user service, and 2, concurrent execution of the common service, a trunking speaking user service and the trunking listening user service; and finally, radio environments to which the trunking service and the common service are applied are complicated similarly, various abnormal situations such as radio link abnormality and inability to synchronize a process of switching a serving cell where a user terminal is located to a target cell to the target cell will be caused in the execution process of the common service and the trunking service. In this case, a target cell is re-selected from the serving cell where the user terminal is located and a neighbor cell thereof to initiate an RRC reestablishment process so as to recover the services. A solution must be found to solve the problem how to recover the trunking listening user service subsequently when an abnormality occurs in the LTE-based trunking communication system where the common service and the trunking service are concurrent.

The abovementioned content is merely used for assisting in understanding the technical solutions of the present document, and it is not representatively admitted that the abovementioned content is the existing technology.

SUMMARY

A main purpose of the present document is to solve the problem on how to recover a trunking listening user service subsequently when an abnormality appears in the reestablishment of an LTE-based trunking communication system.

To achieve abovementioned purpose, the embodiment of the present document provides a method for reestablishing and recovering an LTE-based trunking communication system. The method for reestablishing and recovering an LTE-based trunking communication system includes:

monitoring, by a user terminal, first resource configuration information of a serving cell where the user terminal is located and second resource configuration information of a neighbor cell which are issued by a network side, configuring the user terminal according to the first resource configuration information to allow access of the user terminal serving as a trunking listening user, and storing the second resource configuration information;

establishing, by the user terminal, a Radio Resource Control (RRC) link and a service bearer with the network side to allow access of the user terminal serving as a trunking speaking user and a common service user;

selecting, when the user terminal detects abnormality of a radio link, one cell as a target cell from the service cell where the user terminal is located and the neighbor cell, and sending, by the user terminal, a reestablishment request to the target cell, such that when receiving the reestablishment request, the target cell initiates a reestablishment process according to the reestablishment request to recover a common service or both of a common service and a trunking speaking user service, and recover a trunking listening user service according to the second resource configuration information.

Alternatively, the step of monitoring, by the user terminal, the first resource configuration information of the serving cell where the user terminal is located and the second resource configuration information of the neighbor cell which are issued by the network side, configuring the user terminal according to the first resource configuration information to allow access of the user terminal serving as the trunking listening user and storing the second resource configuration information includes:

reading, by the user terminal, a system information block issued by the network side and including configuration information for collecting trunking paging, and configuring a physical layer of the user terminal with the system information block;

monitoring, by the user terminal, a trunking paging channel to obtain trunking paging issued by the network side and including a Trunking Radio Network Temporary Identity (TRNTI), and configuring the PHY of the user terminal by using the TRNTI;

performing, by the user terminal, a blind detection by using the TRNTI, and monitoring a trunking group control channel to obtain the first resource configuration information and the second resource configuration information issued by the network side;

configuring a physical layer PHY entity, a Media Access Control (MAC) entity, a Radio Link Control (RLC) entity and a Packet Data Convergence Protocol (PDCP) entity of the user terminal according to the first resource configuration information, and storing the second resource configuration information in a storage unit of the user terminal.

Alternatively, the step of selecting, when the user terminal detects abnormality of a radio link, one cell as a target cell from the service cell where the user terminal is located and the neighbor cell, and sending, by the user terminal, a reestablishment request to the target cell, such that when receiving the reestablishment request, the target cell initiates a reestablishment process according to the reestablishment request to recover a common service or both of a common service and a trunking speaking user service, and recover a trunking listening user service according to the second resource configuration information includes:

when the user terminal detects that an out-of-step situation of the radio link appears through the physical layer, sending, by the user terminal, a control command to a physical layer PHY entity through an RRC layer to perform a sweep frequency operation, acquiring all possible frequency points applied to the user terminal in a frequency band, sorting the frequency points in a descending order according to signal strengths, starting to inquire from a frequency point with the highest signal strength, and determining the target cell initiating the reestablishment process;

when the determined target cell is the serving cell where the user terminal is located, keeping a current configuration of the trunking listening user service of the user terminal to work, and sending the reestablishment request to the target cell, such that when receiving the reestablishment request, the target cell initiates the reestablishment process according to the reestablishment request to recover the common service or both of the common service and the trunking speaking user service;

when the determined target cell is the neighbor cell of the serving cell where the user terminal is located, sending, by the user terminal, the reestablishment request to the target cell, such that when receiving the reestablishment request, the target cell initiates the reestablishment process to recover the common service or both of the common service and the trunking speaking user service, and recover the trunking listening user service according to the second resource configuration information.

Alternatively, the step of sending, by the user terminal, the reestablishment request to the target cell when the determined target cell is the neighbor cell of the serving cell where the user terminal is located, such that when receiving the reestablishment request, the target cell initiates the reestablishment process to recover the common service or both of the common service and the trunking speaking user service and recover the trunking listening user service according to the second resource configuration information includes:

when the determined target cell is the neighbor cell of the serving cell where the user terminal is located, if the user terminal stores the second resource configuration information of the neighbor cell, sending, by the user terminal, the reestablishment request to the target cell, such that when receiving the reestablishment request, the target cell initiates the reestablishment process to recover the common service or both of the common service and the trunking speaking user service, and configure the PHY entity, a MAC entity, a RLC entity and a PDCP entity of the user terminal according to the second resource configuration information to recover the trunking listening user service;

when the determined target cell is the neighbor cell of the serving cell where the user terminal is located, if the user terminal does not store the second resource configuration information of the neighbor cell, sending, by the user terminal, the reestablishment request to the target cell, such that when receiving the reestablishment request, the target cell initiates the reestablishment process to recover the common service or both of the common service and the trunking speaking user service, and re-accessing as the trunking listening user.

Alternatively, after the step of when the determined target cell is the neighbor cell of the serving cell where the user terminal is located, sending, by the user terminal, the reestablishment request to the target cell if the user terminal does not store the second resource configuration information of the neighbor cell such that when receiving the reestablishment request, the target cell initiates the reestablishment process to recover the common service or both of the common service and the trunking speaking user service, and re-accessing as the trunking listening user, the method further includes:

monitoring, by the user terminal, a trunking paging channel to obtain the trunking paging issued by the network side and including the TRNTI, and configuring the physical layer of the user terminal by using the TRNTI;

performing, by the user terminal, a blind detection by using the TRNTI, and monitoring a trunking group control channel to obtain third resource configuration information of the target cell and fourth resource configuration information of the neighbor cell of the target cell issued by the network side; and configuring the PHY entity, the MAC entity, the RLC entity and the PDCP entity of the user terminal according to the third resource configuration information to allow re-access of the user terminal serving as the trunking listening user, and storing the fourth resource configuration information in a storage unit of the user terminal.

To achieve the abovementioned purpose, the embodiment of the present document also provides a user terminal. The user terminal includes:

a monitoring processing module, arranged to monitor first resource configuration information of a serving cell where the user terminal is located and second resource configuration information of a neighbor cell which are issued by a network side, configure the user terminal according to the first resource configuration information to allow access of the user terminal serving as a trunking listening user, and store the second resource configuration information;

an establishment module, arranged to establish a Radio Resource Control (RRC) link and a service bearer with the network side to allow access of the user terminal serving as a trunking speaking user and a common service user;

a reestablishment module, arranged to select, when detecting abnormality of a radio link, one cell as a target cell from the service cell where the user terminal is located and the neighbor cell, and send a reestablishment request to the target cell, such that when receiving the reestablishment request, the target cell initiates a reestablishment process according to the reestablishment request to recover a common service or both of a common service and a trunking speaking user service, and recover a trunking listening user service according to the second resource configuration information.

Alternatively, the monitoring processing module is arranged to:

read a system information block issued by the network side and containing configuration information for collecting trunking paging, and configure a physical layer of the user terminal with the system information block;

monitor a trunking paging channel to obtain trunking paging issued by the network side and including a Trunking Radio Network Temporary Identity (TRNTI), and configure the PHY of the user terminal by using the TRNTI;

perform a blind detection by using the TRNTI, and monitor a trunking group control channel to obtain the first resource configuration information and the second resource configuration information issued by the network side; and configure a physical layer PHY entity, a Media Access Control (MAC) entity, a Radio Link Control (RLC) entity and a Packet Data Convergence Protocol (PDCP) entity of the user terminal according to the first resource configuration information, and store the second resource configuration information in a storage unit of the user terminal.

Alternatively, the reestablishment module is arranged to:

when detecting that an out-of-step situation of the radio link appears through the physical layer, send a control command to a physical layer PHY entity through an RRC layer to perform a sweep frequency operation, acquire all possible frequency points applied to the user terminal in a frequency band, sort the frequency points in a descending order according to signal strengths, start to inquire from a frequency point with the highest signal strength, and determine the target cell initiating the reestablishment process;

when the determined target cell is the serving cell where the user terminal is located, keep a current configuration of the trunking listening user service to work, and send the reestablishment request to the target cell, such that when receiving the reestablishment request, the target cell initiates the reestablishment process according to the reestablishment request to recover the common service or both of the common service and the trunking speaking user service;

when the determined target cell is the neighbor cell of the serving cell where the user terminal is located, send the reestablishment request to the target cell, such that when receiving the reestablishment request, the target cell initiates the reestablishment process to recover the common service or both of the common service and the trunking speaking user service, and recover the trunking listening user service according to the second resource configuration information.

Alternatively, the reestablishment module is further arranged to:

when the determined target cell is the neighbor cell of the serving cell where the user terminal is located, if the user terminal stores the second resource configuration information of the neighbor cell, send the reestablishment request to the target cell, such that when receiving the reestablishment request, the target cell initiates the reestablishment process to recover the common service or both of the common service and the trunking speaking user service, and configure the PHY entity, a MAC entity, a RLC entity and a PDCP entity of the user terminal according to the second resource configuration information to recover the trunking listening user service;

when the determined target cell is the neighbor cell of the serving cell where the user terminal is located, if the user terminal does not store the second resource configuration information of the neighbor cell, send the reestablishment request to the target cell, such that when receiving the reestablishment request, the target cell initiates the reestablishment process to recover the common service or both of the common service and the trunking speaking user service, and re-access as the trunking listening user.

Alternatively, the reestablishment module is further arranged to:

monitor a trunking paging channel to obtain the trunking paging issued by the network side and including the TRNTI, and configure the physical layer of the user terminal by using the TRNTI;

perform a blind detection by using the TRNTI, and monitor a trunking group control channel to obtain third resource configuration information of the target cell and fourth resource configuration information of the neighbor cell of the target cell issued by the network side; and configure the PHY entity, the MAC entity, the RLC entity and the PDCP entity of the user terminal according to the third resource configuration information to allow re-access of the user terminal serving as the trunking listening user, and store the fourth resource configuration information in the storage unit of the user terminal.

According to the present document, the user terminal receives the first resource configuration information of the serving cell where the user terminal is located and the second resource configuration information of the neighbor cell of the serving cell which are issued by the network side, the user terminal is configured with the first resource configuration information, and stores the second resource configuration information; when an abnormality occurs in the LTE-based trunking communication system where the common service and the trunking service concurrently run, the serving cell serves as the target cell, the trunking listening user service keeps the current configuration to work, and the target cell initiates the reestablishment process, so the common service or both the common service and the trunking speaking user service of the LTE-based trunking communication system may be recovered; and the neighbor cell of the serving cell serves as the target cell, the reestablishment process is initiated to recover the common service or both the common service and the trunking speaking user service, and then the trunking listening user service is recovered through the second resource configuration information stored by the user terminal, thus implementing recovery of the LTE-based trunking communication system.

The purpose fulfillment, functional characteristics and advantages of the present document will be further elaborated with reference to accompanying drawings in combination with embodiments.

PREFERRED EMBODIMENTS

It should be understood that specific embodiments described herein are only intended to explain the present document and not intended to limit the present document.

Figure 1:
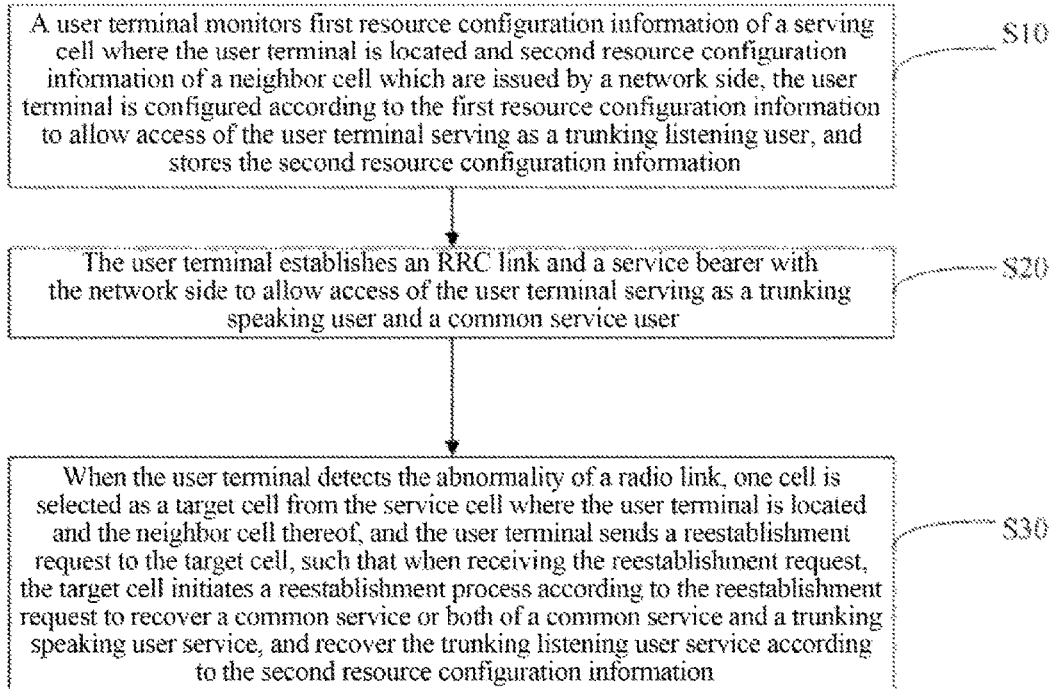
FIG. 1 is a flowchart of a first embodiment of a method for reestablishing and recovering an LTE-based trunking communication system according to the present document.

Referring to FIG. 1, FIG. 1 is a flowchart of a first embodiment of a method for reestablishing and recovering an LTE-based trunking communication system according to the present document.

In the first embodiment, the method for reestablishing and recovering an LTE-based trunking communication system includes the following steps.

Step S10: A user terminal monitors first resource configuration information of a serving cell where the user terminal is located and second resource configuration information of a neighbor cell which are issued by a network side, the user terminal is configured according to the first resource configuration information to allow access of the user terminal serving as a trunking listening user, and stores the second resource configuration information.

The user terminal monitors the first resource configuration information of the serving cell where the user terminal is located and the second resource configuration information of the neighbor cell, the first resource configuration information and the second resource configuration information being issued by the network side, the user terminal is configured with the first resource configuration information to allow access of the user terminal serving as the trunking listening user, and the second resource configuration information is stored, thus facilitating recovery of a trunking listening user service via the second resource configuration information when the neighbor cell is selected to initiate a reestablishment process after an abnormality occurs in an LTE-based trunking communication system.

Step S20: The user terminal establishes an RRC link and a service bearer with the network side to allow access of the user terminal serving as a trunking speaking user and a common service user.

The RRC link and the service bearer are established between the user terminal and the network side to allow access of the user terminal serving as the trunking speaking user and the common service user. Access of the user terminal serving as the trunking speaking user and the common service user simultaneously and access of the user terminal serving as the trunking listening user are not performed in sequence. This is because the trunking listening user uses a public bearer and the trunking listening user does not need to establish the RRC link.

Step S30: When the user terminal detects the abnormality of a radio link, one cell is selected as a target cell from the service cell where the user terminal is located and the neighbor cell thereof, and the user terminal sends a reestablishment request to the target cell, such that when receiving the reestablishment request, the target cell initiates a reestablishment process according to the reestablishment request to recover a common service or both of a common service and a trunking speaking user service, and recover the trunking listening user service according to the second resource configuration information.

When an abnormality of a radio link occurs in the LTE-based trunking communication system, one of the service cell where the user terminal is located and the neighbor cell is determined as the target cell. When the determined target cell is the serving cell, the reestablishment process is initiated in the serving cell, so the common service and trunking service of the LTE-based trunking communication system may be recovered. When the determined target cell is the neighbor cell, the reestablishment process is initiated in the neighbor cell to recover the common service or both of the common service and the trunking speaking user service, and then the trunking listening user service is recovered through the second resource configuration information stored by the user terminal, thus implementing recovery of the LTE-based trunking communication system.

According to this embodiment, the user terminal receives the first resource configuration information of the serving cell where the user terminal is located and the second resource configuration information of the neighbor cell of the serving cell which are issued by the network side, the user terminal is configured with the first resource configuration information, and stores the second resource configuration information; when an abnormality occurs in the LTE-based trunking communication system where the common service and the trunking service concurrently run, the serving cell serves as the target cell, the trunking listening user service keeps the current configuration to work, and the target cell initiates the reestablishment process, so the common service or both the common service and the trunking speaking user service of the LTE-based trunking communication system may be recovered; and the neighbor cell of the serving cell serves as the target cell, the reestablishment process is initiated to recover the common service or both the common service and the trunking speaking user service, and then the trunking listening user service is recovered through the second resource configuration information stored by the user terminal, thus implementing recovery of the LTE-based trunking communication system.

Figure 2:
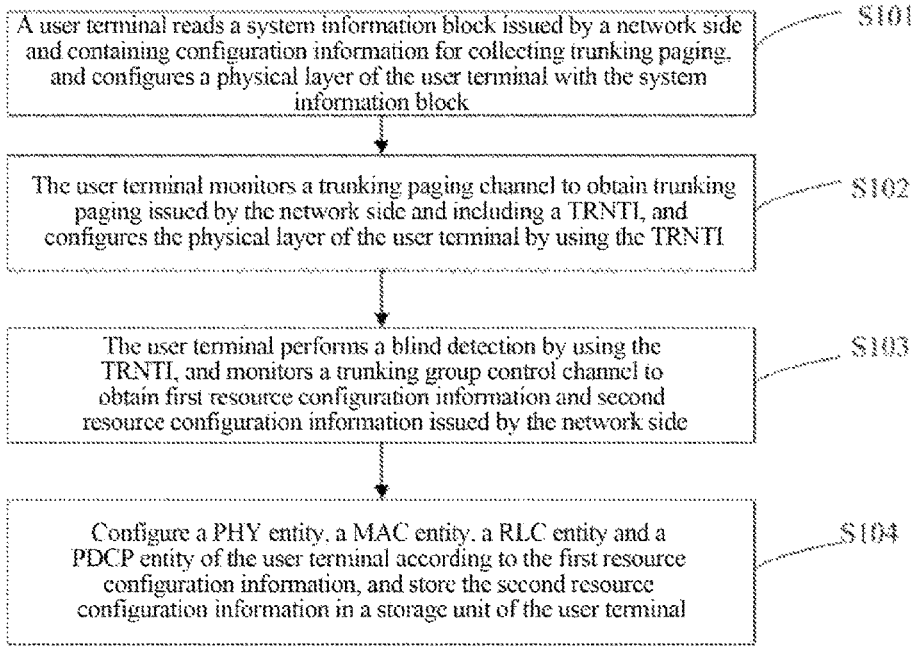
FIG. 2 is a flowchart of detailed steps of a user terminal monitoring first resource configuration information and second resource configuration information and configuring the user terminal according to the first resource configuration information in FIG. 1.

Referring to FIG. 2, FIG. 2 is a flowchart of detailed steps of a user terminal monitoring first resource configuration information and second resource configuration information and configuring the user terminal according to the first resource configuration information in FIG. 1.

Further, Step S10 includes the following steps.

Step S101: The user terminal reads a system information block issued by the network side and containing configuration information for collecting trunking paging, and configures a physical layer of the user terminal with the system information block.

The user terminal reads the system information block, and configures the PHY of the user terminal with the configuration information for collecting the trunking paging in the system information block, such that the user terminal is easy to collect the trunking paging. For example, the configuration information for collecting the trunking paging is a TPCH resource content. After the PHY of the user terminal is configured with the TPCH resource content, the user terminal may detect the trunking paging according to TPCH resource parameters of trunking, thus making detection of the trunking paging convenient, rapid and accurate.

Step S102: The user terminal monitors a trunking paging channel to obtain trunking paging issued by the network side and including a TRNTI, and configures the physical layer of the user terminal by using the TRNTI.

A trunking paging message carries the TRNTI required for receiving trunking configuration information. On one hand, an RTNI of the common service is distinguished, and on the other hand, after the PHY is configured with the TRNTI in the trunking paging, the user terminal may perform a blind detection operation according to the TRNTI, so as to monitor to obtain the first resource configuration information of the serving cell where the user terminal is located and the second resource configuration information of the neighbor cell.

Step S103: The user terminal performs a blind detection by using the TRNTI, and monitors a trunking group control channel to obtain the first resource configuration information and the second resource configuration information issued by the network side.

Step S104: A PHY entity, a MAC entity, a RLC entity and a PDCP entity of the user terminal are configured according to the first resource configuration information, and the second resource configuration information is stored in a storage unit of the user terminal.

After the user terminal configures the PHY entity, MAC entity, RLC entity and PDCP entity of the user terminal with the first resource configuration information, access of the user terminal serving as the trunking listening user is implemented. The second resource configuration information is stored in the storage unit of the user terminal, and configured to serve as a recovery basis for the trunking listening user service when the selected target cell is the neighbor cell of the serving cell where the user terminal is located in case of abnormality of the LTE-based trunking communication system.

According to this embodiment, after reading the system information block issued by the network side and configuring the PHY of the user terminal with the system information block, the user terminal is easy to collect the trunking paging. Then, the user terminal configures the PHY of the user terminal with TRNTI information in the trunking paging, performs the blind detection by using the TRNTI to facilitate quick monitoring the first resource configuration information and second resource configuration information of the trunking group control channel, and configures the PHY entity, MAC entity, RLC entity and PDCP entity of the user terminal with the first resource configuration information to allow access of the user terminal serving as the trunking listening user.

Figure 3:
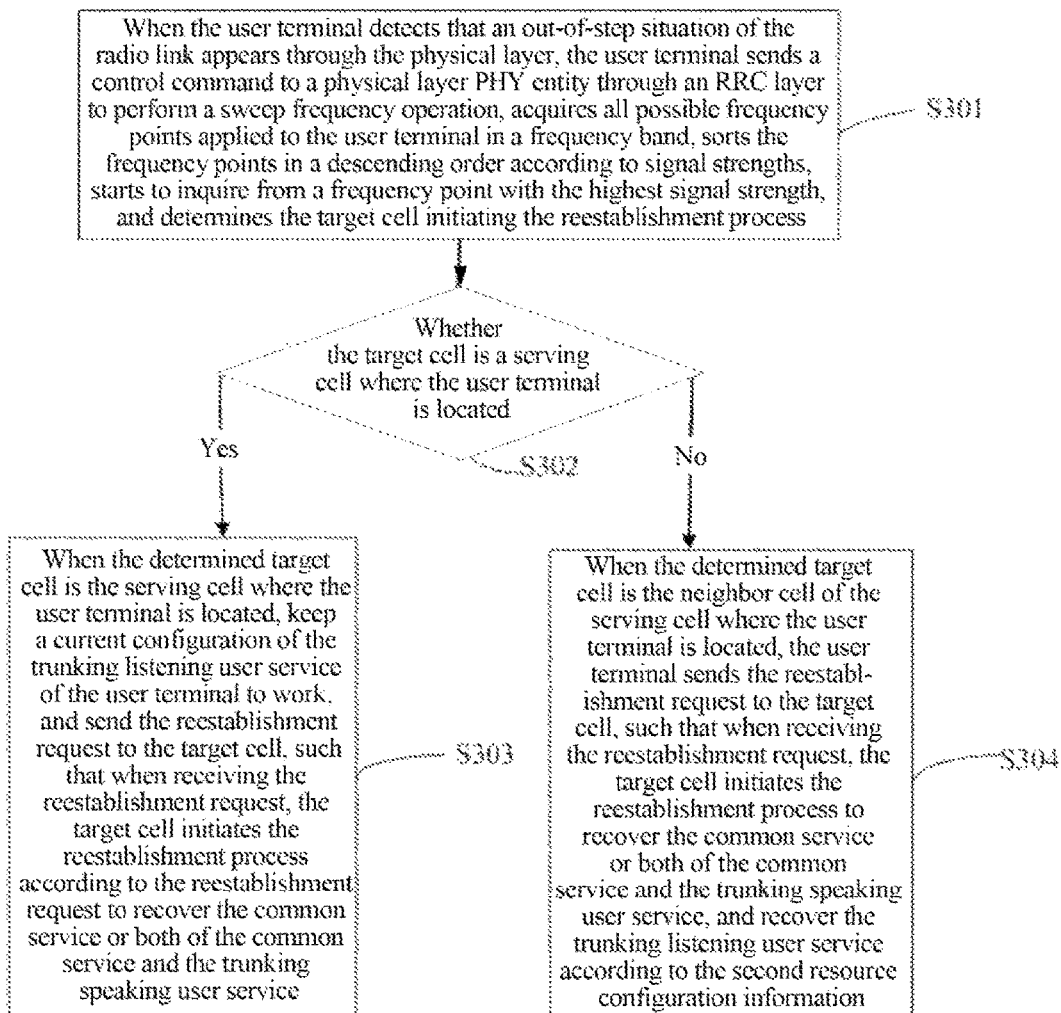
FIG. 3 is a flowchart of detailed steps of selecting a target cell when abnormality of a radio link is detected and sending a reestablishment request to the target cell in FIG. 1.

Referring to FIG. 3, FIG. 3 is a flowchart of detailed steps of selecting a target cell when abnormality of a radio link is detected and sending a reestablishment request to the target cell in FIG. 1.

Further, Step S30 includes the following steps.

Step S301: When the user terminal detects that an out-of-step situation of the radio link appears through the physical layer, the user terminal sends a control command to a physical layer PHY entity through an RRC layer to perform a sweep frequency operation, acquires all possible frequency points applied to the user terminal in a frequency band, sorts the frequency points in a descending order according to signal strengths, starts to inquire from a frequency point with the highest signal strength, and determines the target cell initiating the reestablishment process.

When detecting the out-of-step situation of the radio link, the user terminal acquires all possible frequency points applied to the frequency band of the user terminal through the sweep frequency operation, sorts the frequency points in a descending order according to the signal strengths of the frequency points, starts to inquire from the frequency point with the highest signal strength, and determines the target cell initiating the reestablishment process. The target cell is selected in this manner, thus improving the success rate in initiation of the reestablishment process via the determined target cell.

Step S302: It is judged whether the target cell is the serving cell where the user terminal is located.

Step S303: When the determined target cell is the serving cell where the user terminal is located, the trunking listening user service of the user terminal keeps a current configuration to work, and the reestablishment request is sent to the target cell, such that when receiving the reestablishment request, the target cell initiates the reestablishment process according to the reestablishment request to recover the common service or both of the common service and the trunking speaking user service.

When the determined target cell is the serving cell where the user terminal is located, after the reestablishment process is initiated by the target cell, because the user terminal has configured the PHY entity, MAC entity, RLC entity and PDCP entity of the user terminal with the first configuration information, the reestablishment process is initiated in the target cell, and the common service or both the common service and the trunking speaking user service may be recovered by completing the reestablishment process.

Step S304: When the determined target cell is the neighbor cell of the serving cell where the user terminal is located, the user terminal sends the reestablishment request to the target cell, such that when receiving the reestablishment request, the target cell initiates the reestablishment process to recover the common service or both of the common service and the trunking speaking user service, and recover the trunking listening user service according to the second resource configuration information in the reestablishment request.

When the determined target cell is the neighbor cell where the user terminal is located, the common service or both the common service and the trunking speaking user service may be recovered by initiating the reestablishment process in the neighbor cell, and then the trunking listening user service is recovered by using the second resource configuration information stored by the user terminal, thus avoiding re-access of the user terminal serving as the trunking listening user at each time after an abnormality occurs in the LTE-based trunking communication system.

According to this embodiment, the user terminal detects the abnormality of the radio link through the PHY, performs the sweep frequency operation through the PHY entity, acquires all possible frequency points applied to the frequency band of the user terminal, sorts the frequency points in a descending order according to the signal strengths, starts to inquire from the frequency point with the highest signal strength, and determines the target cell initiating the reestablishment process, the determined target cell being a cell most meeting a reestablishment requirement; and it is judged whether the target cell is the serving cell where the user terminal is located, if so, it is only necessary to initiate the reestablishment process to be capable of recovering the common service or both the common service and the trunking speaking user service, if not, the reestablishment process is initiated to recover the common service or both the common service and the trunking speaking user service, and the trunking listening user service is recovered according to the second resource configuration information stored by the user terminal without access of the user terminal serving as the trunking listening user, thus making the recovery process of the LTE-based trunking communication system simple and convenient.

Figure 4:
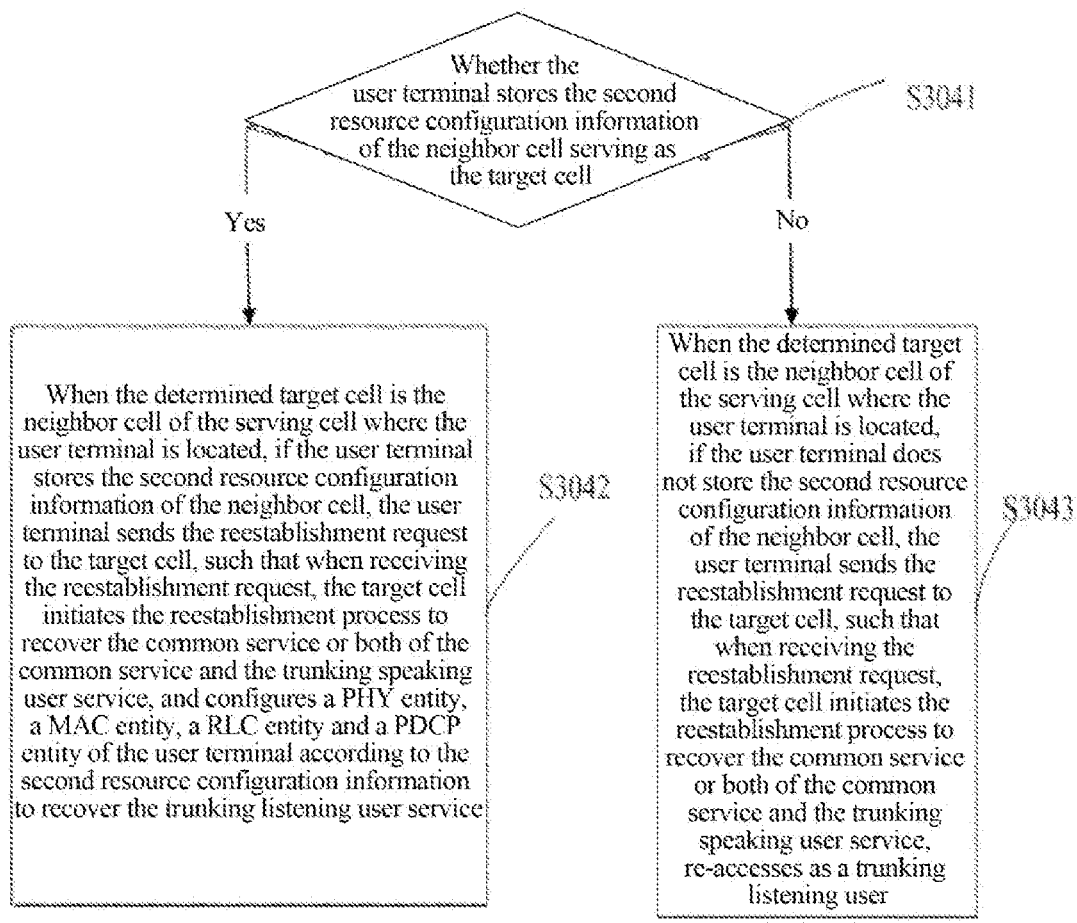
FIG. 4 is a flowchart of detailed steps of when a determined target cell is a neighbor cell of a serving cell where a user terminal is located recovering a common service and a trunking service in FIG. 3.

Referring to FIG. 4, FIG. 4 is a flowchart of detailed steps of when a determined target cell is a neighbor cell of a serving cell where a user terminal is located recovering a common service and a trunking service in FIG. 3.

Further, Step S304 includes the following steps.

Step S3041: It is judged whether the user terminal stores the second resource configuration information of the neighbor cell serving as the target cell.

Step S3042: When the determined target cell is the neighbor cell of the serving cell where the user terminal is located, if the user terminal stores the second resource configuration information of the neighbor cell, the user terminal sends the reestablishment request to the target cell, such that when receiving the reestablishment request, the target cell initiates the reestablishment process to recover the common service or both of the common service and the trunking speaking user service, and configures a PHY entity, a MAC entity, a RLC entity and a PDCP entity of the user terminal according to the second resource configuration information to recover the trunking listening user service.

The determined target cell is the neighbor cell where the user terminal is located, the second resource configuration information of the neighbor cell is stored in the user terminal, the common service or both of the common service and the trunking speaking user service may be recovered by initiating the reestablishment process in the neighbor cell, and then the PHY entity, MAC entity, RLC entity and PDCP entity of the user terminal are configured by using the second resource configuration information stored by the user terminal, so as to recover the trunking listening user service.

Step S3043: When the determined target cell is the neighbor cell of the serving cell where the user terminal is located, if the user terminal does not store the second resource configuration information of the neighbor cell, the user terminal sends the reestablishment request to the target cell, such that when receiving the reestablishment request, the target cell initiates the reestablishment process to recover the common service or both of the common service and the trunking speaking user service, re-accesses as a trunking listening user.

The determined target cell is the neighbor cell where the user terminal is located, the second resource configuration information of the neighbor cell is not stored in the user terminal, the common service or both of the common service and the trunking speaking user service may be recovered by initiating the reestablishment process in the neighbor cell, and the user terminal is re-accessed by serving as the trunking listening user in the neighbor cell, so as to recover the trunking listening user service.

According to the present embodiment, the determined target cell is the neighbor cell where the user terminal is located, the second resource configuration information of the neighbor cell is stored in the user terminal, the common service or both of the common service and the trunking speaking user service may be recovered by initiating the reestablishment process in the neighbor cell, and then the PHY entity, MAC entity, RLC entity and PDCP entity of the user terminal are configured by using the second resource configuration information stored by the user terminal, so as to recover the trunking listening user service, thus avoiding re-access of the trunking listening user to recover the trunking listening user service after an abnormality occurs in the LTE-based trunking communication system. When the second resource configuration information of the neighbor cell is not stored in the user terminal, the user terminal is re-accessed by serving as the trunking listening user, so as to recover the trunking listening user service.

Figure 5:
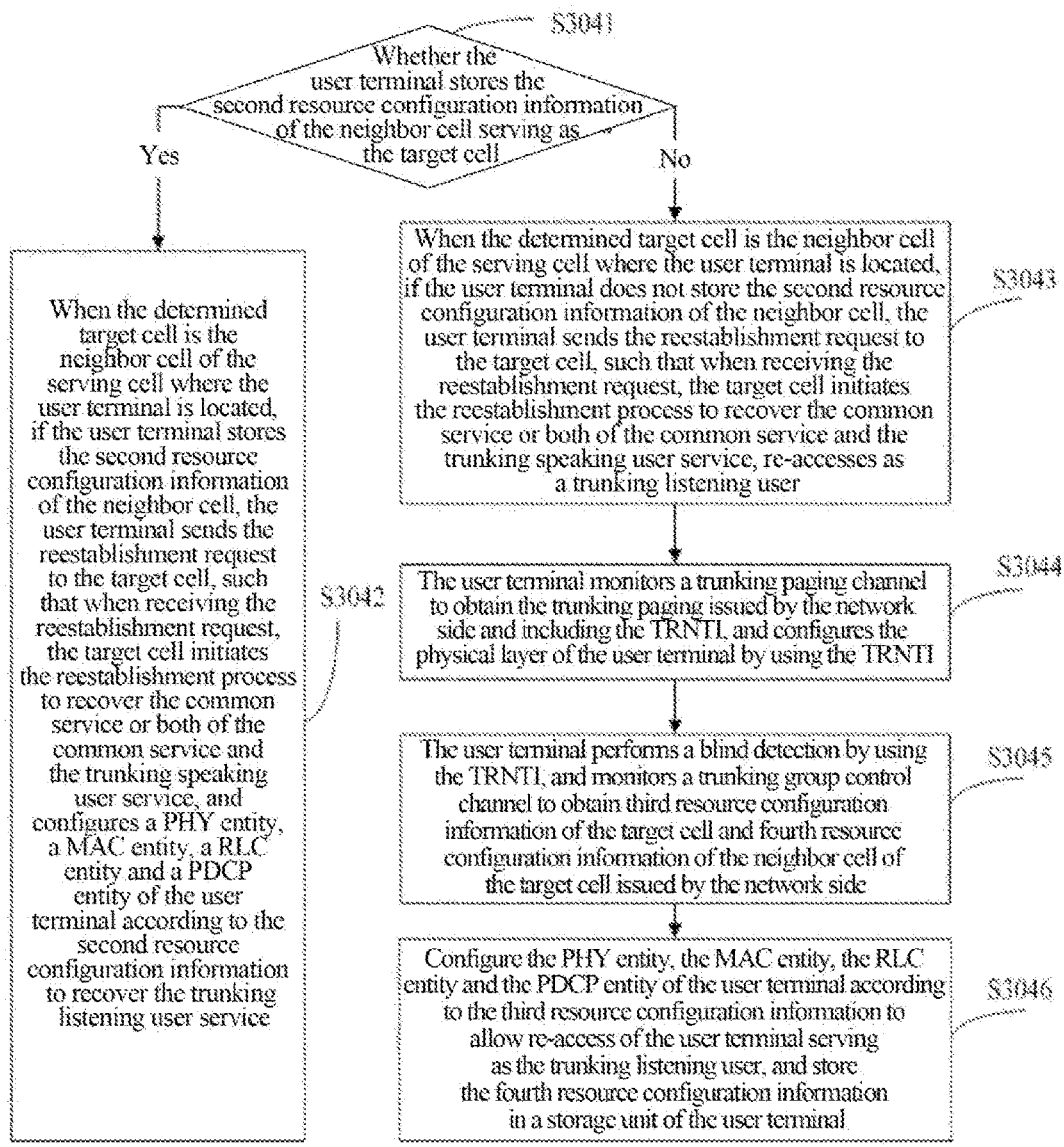
FIG. 5 is a flowchart of a second embodiment of a method for reestablishing and recovering an LTE-based trunking communication system according to the present document.

Referring to FIG. 5, FIG. 5 is a flowchart of a second embodiment of a method for reestablishing and recovering an LTE-based trunking communication system according to the present document.

In the second embodiment, the steps of the method for reestablishing and recovering an LTE-based trunking communication system are identical to those in the first embodiment. The difference lies in that after Step S3043, the method for reestablishing and recovering an LTE-based trunking communication system further includes the following steps.

Step S3044: The user terminal monitors the TPCH to obtain the trunking paging issued by the network side and including the TRNTI, and configures the PHY of the user terminal by using the TRNTI.

The trunking paging message carries the TRNTI required for receiving the trunking configuration information. On one hand, the RTNI of the common service is distinguished, and on the other hand, after the PHY is configured with the TRNTI in the trunking paging, the user terminal may execute the blind detection operation according to the TRNTI, so as to monitor to obtain the third resource configuration information of the current target cell initiating the reestablishment process and the fourth resource configuration information of the neighbor cell.

Step S3045: The user terminal performs a blind detection by using the TRNTI, and monitors the trunking group control channel to obtain the third resource configuration information of the target cell and the fourth resource configuration information of the neighbor cell of the target cell, issued by the network side.

Step S3046: The PHY entity, the MAC entity, the RLC entity and the PDCP entity of the user terminal are configured according to the third resource configuration information to allow re-access of the user terminal serving as the trunking listening user, and the fourth resource configuration information is stored in the storage unit of the user terminal.

After the user terminal configures the PHY entity, the MAC entity, the RLC entity and the PDCP entity of the user terminal by using the third resource configuration information, access of the user terminal serving as the trunking listening user is implemented.

According to this embodiment, when the second resource configuration information of the neighbor cell serving as the target cell initiating the reestablishment process is not stored in the storage unit of the user terminal, a user re-acquires the third resource configuration information of the target cell and the fourth resource configuration information of the neighbor cell by re-acquiring the trunking paging in the target cell. In combination with the abovementioned situation, it is ensured that recovery can be implemented no matter how the LTE-based trunking communication system of the present document is. Moreover, the fourth resource configuration information of the target cell and the neighbor cell is stored again, and basis is provided for later recovery of the trunking listening user service when an abnormality occurs in the LTE-based trunking communication system.

The present document further provides a user terminal.

Figure 6:
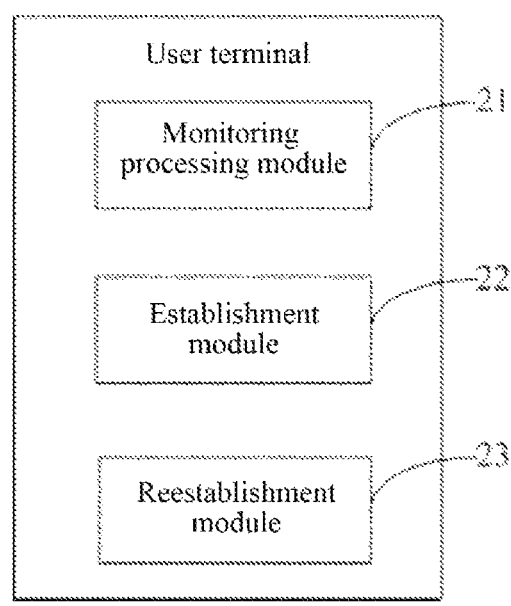
FIG. 6 is a schematic diagram of functional modules of a user terminal according to a first embodiment of the present document.

Referring to FIG. 6, FIG. 6 is a schematic diagram of a functional module of a user terminal according to a first embodiment of the present document.

In the first embodiment, the user terminal includes:

a monitoring processing module 21, arranged to monitor first resource configuration information of a serving cell where the user terminal is located and second resource configuration information of a neighbor cell which are issued by a network side, configure the user terminal according to the first resource configuration information to allow access of the user terminal serving as a trunking listening user, and store the second resource configuration information;

a establishment module 22, arranged to establish a Radio Resource Control (RRC) link and a service bearer with the network side to allow access of the user terminal serving as a trunking speaking user and a common service user;

a reestablishment module 23, arranged to select, when detecting abnormality of a radio link, one cell as a target cell from the service cell where the user terminal is located and the neighbor cell, and send a reestablishment request to the target cell, such that when receiving the reestablishment request, the target cell initiates a reestablishment process according to the reestablishment request to recover a common service or both of a common service and a trunking speaking user service, and recover a trunking listening user service according to the second resource configuration information.

The monitoring processing module 21 of the user terminal monitors the first resource configuration information of the serving cell where the user terminal is located and the second resource configuration information of the neighbor cell, the first resource configuration information and the second resource configuration information being issued by the network side, the monitoring processing module 21 configures the user terminal with the first resource configuration information to allow access of the user terminal serving as the trunking listening user, and the second resource configuration information is stored, thus facilitating recovery of a trunking listening user service via the second resource configuration information when the neighbor cell is selected to initiate a reestablishment process after an abnormality occurs in an LTE-based trunking communication system.

The establishment module 22 of the user terminal establishes the RRC link and the service bearer between the user terminal and the network side to allow access of the user terminal serving as the trunking speaking user and the common service user. Access of the user terminal serving as the trunking speaking user and the common service user simultaneously and access of the user terminal serving as the trunking listening user are not performed in sequence. This is because the trunking listening user uses a public bearer and the trunking listening user does not need to establish the RRC link.

When an abnormality of a radio link occurs in the LTE-based trunking communication system, the reestablishment module 23 of the user terminal determines one of the service cell where the user terminal is located and the neighbor cell as the target cell. When the determined target cell is the serving cell, the trunking listening user service keeps the current configuration to work, and the reestablishment module 23 initiates the reestablishment process in the serving cell, so the common service and trunking service of the LTE-based trunking communication system or the common service and trunking speaking user service may be recovered. When the determined target cell is the neighbor cell, the reestablishment module 23 initiates the reestablishment process in the neighbor cell to recover the common service or both of the common service and the trunking speaking user service, and then the trunking listening user service is recovered through the second resource configuration information stored by the user terminal, thus implementing recovery of the LTE-based trunking communication system.

According to this embodiment, the monitoring processing module 21 of the user terminal receives the first resource configuration information of the serving cell where the user terminal is located and the second resource configuration information of the neighbor cell of the serving cell which are issued by the network side, the monitoring processing module 21 configures the user terminal with the first resource configuration information, and stores the second resource configuration information; when an abnormality occurs in the LTE-based trunking communication system where the common service and the trunking service concurrently run, the reestablishment module 23 initiates the reestablishment request, such that after receiving the reestablishment request, the target cell initiates the reestablishment process; if the serving cell serves as the target cell, the trunking listening user service keeps the current configuration to work, and the target cell initiates the reestablishment process, so the common service or both the common service and the trunking speaking user service of the LTE-based trunking communication system may be recovered; and if the neighbor cell of the serving cell serves as the target cell, the reestablishment process is initiated to recover the common service or both the common service and the trunking speaking user service, and then the trunking listening user service is recovered through the second resource configuration information stored by the user terminal, thus implementing recovery of the LTE-based trunking communication system.

Further, the monitoring processing module 21 is arranged to:

read a system information block issued by the network side and containing configuration information for collecting trunking paging, and configure a physical layer of the user terminal with the system information block;

monitor a trunking paging channel to obtain trunking paging issued by the network side and including a Trunking Radio Network Temporary Identity (TRNTI), and configure the PHY of the user terminal by using the TRNTI;

perform a blind detection by using the TRNTI, and monitor a trunking group control channel to obtain the first resource configuration information and the second resource configuration information issued by the network side; and configure a physical layer PHY entity, a Media Access Control (MAC) entity, a Radio Link Control (RLC) entity and a Packet Data Convergence Protocol (PDCP) entity of the user terminal according to the first resource configuration information, and store the second resource configuration information in a storage unit of the user terminal.

The monitoring processing module 21 of the user terminal reads the system information block, and configures the PHY of the user terminal with the configuration information for collecting the trunking paging in the system information block, such that the user terminal is easy to collect the trunking paging. For example, the configuration information for collecting the trunking paging is a TPCH resource content. After the PHY of the user terminal is arranged with the TPCH resource content, the user terminal may detect the trunking paging according to TPCH resource parameters of trunking, thus making detection of the trunking paging convenient, rapid and accurate.

A trunking paging message carries the TRNTI required for receiving trunking configuration information. On one hand, the monitoring processing module 21 distinguishes an RTNI of the common service by using the TRNTI, and on the other hand, after the monitoring processing module 21 configures the PHY with the TRNTI in the trunking paging, the user terminal may perform a blind detection operation according to the TRNTI, so as to monitor to obtain the first resource configuration information of the serving cell where the user terminal is located and the second resource configuration information of the neighbor cell.

After the monitoring processing module 21 of the user terminal configures the PHY entity, MAC entity, RLC entity and PDCP entity of the user terminal with the first resource configuration information, access of the user terminal serving as the trunking listening user is implemented. The second resource configuration information is stored in the storage unit of the user terminal, and arranged to serve as a recovery basis for the trunking listening user service when the selected target cell is the neighbor cell of the serving cell where the user terminal is located in case of abnormality of the LTE-based trunking communication system.

According to this embodiment, after reading the system information block issued by the network side and configuring the PHY of the user terminal with the system information block, the monitoring processing module 21 of the user terminal is easy to collect the trunking paging. Then, the monitoring processing module 21 configures the PHY of the user terminal with TRNTI information in the trunking paging, the monitoring processing module 21 performs blind detection by using the TRNTI to facilitate quick monitoring of the first resource configuration information and second resource configuration information of the trunking group control channel, and the monitoring processing module 21 configures the PHY entity, MAC entity, RLC entity and PDCP entity of the user terminal with the first resource configuration information to allow access of the user terminal serving as the trunking listening user.

Further, the reestablishment module 23 is arranged to:

when detecting that an out-of-step situation of the radio link appears through the physical layer, send a control command to a physical layer PHY entity through an RRC layer to perform a sweep frequency operation, acquire all possible frequency points applied to the user terminal in a frequency band, sort the frequency points in a descending order according to signal strengths, start to inquire from a frequency point with the highest signal strength, and determine the target cell initiating the reestablishment process;

when the determined target cell is the serving cell where the user terminal is located, keep a current configuration of the trunking listening user service to work, and send the reestablishment request to the target cell, such that when receiving the reestablishment request, the target cell initiates the reestablishment process according to the reestablishment request to recover the common service or both of the common service and the trunking speaking user service;

when the determined target cell is the neighbor cell of the serving cell where the user terminal is located, send the reestablishment request to the target cell, such that when receiving the reestablishment request, the target cell initiates the reestablishment process to recover the common service or both of the common service and the trunking speaking user service, and recover the trunking listening user service according to the second resource configuration information.

When detecting the out-of-step situation of the radio link, the reestablishment module 23 of the user terminal acquires all possible frequency points applied to the frequency band of the user terminal through the sweep frequency operation, sorts the frequency points in a descending order according to the signal strengths of the frequency points, starts to inquire from the frequency point with the highest signal strength, and determines the target cell initiating the reestablishment process. The target cell is selected in this manner, thus improving the success rate in initiation of the reestablishment process via the determined target cell.

When the determined target cell is the serving cell where the user terminal is located, after the reestablishment module 23 initiates the reestablishment process by the target cell, because the user terminal has configured the PHY entity, MAC entity, RLC entity and PDCP entity of the user terminal with the first configuration information, the reestablishment process is initiated in the target cell, and the common service or both the common service and the trunking speaking user service may be recovered by completing the reestablishment process.

When the determined target cell is the neighbor cell where the user terminal is located, the common service or both the common service and the trunking speaking user service may be recovered after the reestablishment module 23 initiates the reestablishment process in the neighbor cell, and then the reestablishment module 23 recovers the trunking listening user service by further using the second resource configuration information stored by the user terminal, thus avoiding re-access of the user terminal serving as the trunking listening user at each time after an abnormality occurs in the LTE-based trunking communication system.

According to this embodiment, the reestablishment module 23 of the user terminal detects the abnormality of the radio link through the PHY and performs the sweep frequency operation through the PHY entity, and the reestablishment module 23 acquires all possible frequency points applied to the frequency band of the user terminal, sorts the frequency points in a descending order according to the signal strengths, starts to inquire from the frequency point with the highest signal strength, and determines the target cell initiating the reestablishment process, the determined target cell being a cell most meeting a reestablishment requirement; and it is judged whether the target cell is the serving cell where the user terminal is located, if so, the trunking listening user keeps the current configuration to work, it is only necessary to initiate the reestablishment process to be capable of recovering the common service or both the common service and the trunking speaking user service, if not, the reestablishment process is initiated to recover the common service or both the common service and the trunking speaking user service, and the trunking service is recovered according to the second resource configuration information, thus making the recovery process of the LTE-based trunking communication system simple and convenient.

Further, the reestablishment module 23 is further arranged to:

when the determined target cell is the neighbor cell of the serving cell where the user terminal is located, if the user terminal stores the second resource configuration information of the neighbor cell, send the reestablishment request to the target cell, such that when receiving the reestablishment request, the target cell initiates the reestablishment process to recover the common service or both of the common service and the trunking speaking user service, and configure the PHY entity, a MAC entity, a RLC entity and a PDCP entity of the user terminal according to the second resource configuration information to recover the trunking listening user service;

when the determined target cell is the neighbor cell of the serving cell where the user terminal is located, if the user terminal does not store the second resource configuration information of the neighbor cell, send the reestablishment request to the target cell, such that when receiving the reestablishment request, the target cell initiates the reestablishment process to recover the common service or both of the common service and the trunking speaking user service, and re-access as the trunking listening user.

The determined target cell is the neighbor cell where the user terminal is located, the second resource configuration information of the neighbor cell is stored in the user terminal, the common service or both of the common service and the trunking speaking user service may be recovered by initiating the reestablishment process in the neighbor cell, and then the PHY entity, MAC entity, RLC entity and PDCP entity of the user terminal are configured by using the second resource configuration information stored by the user terminal, so as to recover the trunking listening user service.

The determined target cell is the neighbor cell where the user terminal is located, the second resource configuration information of the neighbor cell is not stored in the user terminal, the common service or both of the common service and the trunking speaking user service may be recovered after the reestablishment module 23 initiates the reestablishment process in the neighbor cell, and the user terminal is re-accessed by serving as the trunking listening user in the neighbor cell, so as to recover the trunking listening user service.

According to this embodiment, the determined target cell is the neighbor cell where the user terminal is located, the second resource configuration information of the neighbor cell is stored in the user terminal, the common service or both of the common service and the trunking speaking user service may be recovered after the reestablishment module 23 initiates the reestablishment process in the neighbor cell, and then the PHY entity, MAC entity, RLC entity and PDCP entity of the user terminal are configured by using the second resource configuration information stored by the user terminal, so as to recover the trunking listening user service, thus avoiding re-access of the trunking listening user to recover the trunking service after an abnormality occurs in the LTE-based trunking communication system. When the second resource configuration information of the neighbor cell is not stored in the user terminal, the user terminal is re-accessed by serving as the trunking listening user, so as to recover the trunking listening user service.

Further, the reestablishment module 23 is further arranged to:

monitor a trunking paging channel to obtain the trunking paging issued by the network side and including the TRNTI, and configure the physical layer of the user terminal by using the TRNTI;

perform a blind detection by using the TRNTI, and monitor a trunking group control channel to obtain third resource configuration information of the target cell and fourth resource configuration information of the neighbor cell of the target cell issued by the network side; and configure the PHY entity, the MAC entity, the RLC entity and the PDCP entity of the user terminal according to the third resource configuration information to allow re-access of the user terminal serving as the trunking listening user, and store the fourth resource configuration information in the storage unit of the user terminal.

The trunking paging message carries the TRNTI required for receiving the trunking configuration information. On one hand, the reestablishment module 23 distinguishes the RTNI of the common service by using the TRNTI, and on the other hand, after the reestablishment module 23 configures the PHY with the TRNTI in the trunking paging, the user terminal may perform the blind detection operation according to the TRNTI, so as to monitor to obtain the third resource configuration information of the current target cell and the fourth resource configuration information of the neighbor cell.

After the reestablishment module 23 of the user terminal configures the PHY entity, MAC entity, RLC entity and PDCP entity of the user terminal by using the third resource configuration information, access of the user terminal serving as the trunking listening user is implemented.

According to this embodiment, when the second resource configuration information of the neighbor cell serving as the target cell initiating the reestablishment process is not stored in the storage unit of the user terminal, the reestablishment module 23 re-acquires the third resource configuration information of the target cell and the fourth resource configuration information of the neighbor cell by re-acquiring the trunking paging in the target cell by a user. In combination with the abovementioned situation, it is ensured that the LTE-based trunking communication system of the present document is recovered. Moreover, the fourth resource configuration information of the target cell and the neighbor cell is stored again, and basis is provided for later recovery of the trunking listening user service when an abnormality occurs in the LTE-based trunking communication system.

The above is only the alternative embodiments of the present document and does not limit the patent scope of the present document accordingly. Equivalent structure or equivalent flow transformations made by utilizing the description and accompany drawings of the present document or direct or indirect applications to other relevant technical fields may fall within the patent protection scope of the present document in the same way.

INDUSTRIAL APPLICABILITY

According to the present document, the user terminal receives the first resource configuration information of the serving cell where the user terminal is located and the second resource configuration information of the neighbor cell of the serving cell which are issued by the network side, the user terminal is configured with the first resource configuration information, and stores the second resource configuration information; when an abnormality occurs in the LTE-based trunking communication system where the common service and the trunking service concurrently run, the serving cell serves as the target cell, the trunking listening user service keeps the current configuration to work, and the target cell initiates the reestablishment process, so the common service or both the common service and the trunking speaking user service of the LTE-based trunking communication system may be recovered; and the neighbor cell of the serving cell serves as the target cell, the reestablishment process is initiated to recover the common service or both the common service and the trunking speaking user service, and then the trunking listening user service is recovered through the second resource configuration information stored by the user terminal, thus implementing recovery of the LTE-based trunking communication system.

I claim:

1. A method for reestablishing and recovering a Long Term Evolution (LTE)-based trunking communication system, comprising:

monitoring, by a user terminal, first resource configuration information of a serving cell where the user terminal is located and second resource configuration information of a neighbor cell which are issued by a network side, configuring the user terminal according to the first resource configuration information to allow access of the user terminal serving as a trunking listening user, and receiving the second resource configuration information; wherein, the step of monitoring, by the user terminal, the first resource configuration information of the serving cell where the user terminal is located and the second resource configuration information of the neighbor cell which are issued by the network side, configuring the user terminal according to the first resource configuration information to allow access of the user terminal serving as the trunking listening user and storing the second resource configuration information comprises:

reading, by the user terminal, a system information block issued by the network side and comprising configuration information for collecting trunking paging, wherein the configuration information for collecting the trunking paging is a Trunking Paging Channel (TPCH) resource information, and configuring a physical layer of the user terminal with the TPCH resource information to detect trunking paging according to TPCH resource parameters;

monitoring, by the user terminal, a trunking paging channel to obtain trunking paging issued by the network side and comprising a Trunking Radio Network Temporary Identity (TRNTI), and configuring the PHY of the user terminal by using the TRNTI;

performing, by the user terminal, a blind detection by using the TRNTI, and monitoring a trunking group control channel to obtain the first resource configuration information and the second resource configuration information issued by the network side;

configuring a physical layer PHY entity, a Media Access Control (MAC) entity, a Radio Link Control (RLC) entity and a Packet Data Convergence Protocol (PDCP) entity of the user terminal according to the first resource configuration information, and storing the second resource configuration information in a storage unit of the user terminal;

establishing, by the user terminal, a Radio Resource Control (RRC) link and a service bearer with the network side to allow access of the user terminal serving as a trunking speaking user and a common service user;

selecting, when the user terminal detects abnormality of a radio link, one cell as a target cell from the service cell where the user terminal is located and the neighbor cell, and sending, by the user terminal, a reestablishment request to the target cell, such that when receiving the reestablishment request, the target cell initiates a reestablishment process according to the reestablishment request to recover a common service or both of a common service and a trunking speaking user service, and recover a trunking listening user service according to the second resource configuration information.

2. The method for reestablishing and recovering an LTE-based trunking communication system according to claim 1, wherein, the step of selecting, when the user terminal detects abnormality of a radio link, one cell as a target cell from the service cell where the user terminal is located and the neighbor cell, and sending, by the user terminal, a reestablishment request to the target cell, such that when receiving the reestablishment request, the target cell initiates a reestablishment process according to the reestablishment request to recover a common service or both of a common service and a trunking speaking user service, and recover a trunking listening user service according to the second resource configuration information comprises:

when the user terminal detects that an out-of-step situation of the radio link appears through the physical layer, sending, by the user terminal, a control command to a physical layer PHY entity through an RRC layer to perform a sweep frequency operation, acquiring all possible frequency points applied to the user terminal in a frequency band, sorting the frequency points in a descending order according to signal strengths, searching from a frequency point with the highest signal strength, and determining the target cell selected for initiating the reestablishment process;

when the determined target cell is the serving cell where the user terminal is located, keeping a current configuration of the trunking listening user service of the user terminal and working under the current configuration, and sending the reestablishment request to the target cell, such that when receiving the reestablishment request, the target cell initiates the reestablishment process according to the reestablishment request to recover the common service or both of the common service and the trunking speaking user service;

when the determined target cell is the neighbor cell of the serving cell where the user terminal is located, sending, by the user terminal, the reestablishment request to the target cell, such that when receiving the reestablishment request, the target cell initiates the reestablishment process to recover the common service or both of the common service and the trunking speaking user service, and recover the trunking listening user service according to the second resource configuration information.

3. The method for reestablishing and recovering an LTE-based trunking communication system according to claim 2, wherein, the step of sending, by the user terminal, the reestablishment request to the target cell when the determined target cell is the neighbor cell of the serving cell where the user terminal is located, such that when receiving the reestablishment request, the target cell initiates the reestablishment process to recover the common service or both of the common service and the trunking speaking user service and recover the trunking listening user service according to the second resource configuration information comprises:

when the determined target cell is the neighbor cell of the serving cell where the user terminal is located, if the user terminal stores the second resource configuration information of the neighbor cell, sending, by the user terminal, the reestablishment request to the target cell, such that when receiving the reestablishment request, the target cell initiates the reestablishment process to recover the common service or both of the common service and the trunking speaking user service, and configure the PHY entity, a MAC entity, a RLC entity and a PDCP entity of the user terminal according to the second resource configuration information to recover the trunking listening user service;

when the determined target cell is the neighbor cell of the serving cell where the user terminal is located, if the user terminal does not store the second resource configuration information of the neighbor cell, sending, by the user terminal, the reestablishment request to the target cell, such that when receiving the reestablishment request, the target cell initiates the reestablishment process to recover the common service or both of the common service and the trunking speaking user service, and re-accessing as the trunking listening user.

4. The method for reestablishing and recovering an LTE-based trunking communication system according to claim 3, wherein, after the step of when the determined target cell is the neighbor cell of the serving cell where the user terminal is located, sending, by the user terminal, the reestablishment request to the target cell if the user terminal does not store the second resource configuration information of the neighbor cell such that when receiving the reestablishment request, the target cell initiates the reestablishment process to recover the common service or both of the common service and the trunking speaking user service, and re-accessing as the trunking listening user, the method further comprises:
monitoring, by the user terminal, a trunking paging channel to obtain the trunking paging issued by the network side and comprising the TRNTI, and configuring the physical layer of the user terminal by using the TRNTI;
performing, by the user terminal, a blind detection by using the TRNTI, and monitoring a trunking group control channel to obtain third resource configuration information of the target cell and fourth resource configuration information of the neighbor cell of the target cell issued by the network side; and
configuring the PHY entity, the MAC entity, the RLC entity and the PDCP entity of the user terminal according to the third resource configuration information to allow re-access of the user terminal serving as the trunking listening user, and storing the fourth resource configuration information in a storage unit of the user terminal.

5. A user terminal, comprising:
a monitoring processing module, arranged to monitor first resource configuration information of a serving cell where the user terminal is located and second resource configuration information of a neighbor cell which are issued by a network side, configure the user terminal according to the first resource configuration information to allow access of the user terminal serving as a trunking listening user, and receive the second resource configuration information; wherein the monitoring processing module is arranged to:
read a system information block issued by the network side and comprising configuration information for collecting trunking paging, wherein the configuration information for collecting the trunking paging is TPCH resource information, and configure a physical layer of the user terminal with the TPCH resource information to detect trunking paging according to TPCH resource parameters;
monitor a trunking paging channel to obtain trunking paging issued by the network side and comprising a Trunking Radio Network Temporary Identity (TRNTI), and configure the PHY of the user terminal by using the TRNTI;
perform a blind detection by using the TRNTI, and monitor a trunking group control channel to obtain the first resource configuration information and the second resource configuration information issued by the network side; and
configure a physical layer PHY entity, a Media Access Control (MAC) entity, a Radio Link Control (RLC) entity and a Packet Data Convergence Protocol (PDCP) entity of the user terminal according to the first resource configuration information, and store the second resource configuration information in a storage unit of the user terminal;
an establishment module, arranged to establish a Radio Resource Control (RRC) link and a service bearer with the network side to allow access of the user terminal serving as a trunking speaking user and a common service user;
a reestablishment module, arranged to select, when detecting abnormality of a radio link, one cell as a target cell from the service cell where the user terminal is located and the neighbor cell, and send a reestablishment request to the target cell, such that when receiving the reestablishment request, the target cell initiates a reestablishment process according to the reestablishment request to recover a common service or both of a common service and a trunking speaking user service, and recover a trunking listening user service according to the second resource configuration information.

6. The user terminal according to claim 5, wherein the reestablishment module is arranged to:
when detecting that an out-of-step situation of the radio link appears through the physical layer, send a control command to a physical layer PHY entity through an RRC layer to perform a sweep frequency operation, acquire all possible frequency points applied to the user terminal in a frequency band, sort the frequency points in a descending order according to signal strengths, search from a frequency point with the highest signal strength, and determine the target cell selected for initiating the reestablishment process;
when the determined target cell is the serving cell where the user terminal is located, keep a current configuration of the trunking listening user service, work under the current configuration, and send the reestablishment request to the target cell, such that when receiving the reestablishment request, the target cell initiates the reestablishment process according to the reestablishment request to recover the common service or both of the common service and the trunking speaking user service;
when the determined target cell is the neighbor cell of the serving cell where the user terminal is located, send the reestablishment request to the target cell, such that when receiving the reestablishment request, the target cell initiates the reestablishment process to recover the common service or both of the common service and the trunking speaking user service, and recover the trunking listening user service according to the second resource configuration information.

7. The user terminal according to claim 6, wherein the reestablishment module is further arranged to:
when the determined target cell is the neighbor cell of the serving cell where the user terminal is located, if the user terminal stores the second resource configuration information of the neighbor cell, send the reestablishment request to the target cell, such that when receiving the reestablishment request, the target cell initiates the reestablishment process to recover the common service or both of the common service and the trunking speaking user service, and configure the PHY entity, a MAC entity, a RLC entity and a PDCP entity of the user terminal according to the second resource configuration information to recover the trunking listening user service;
when the determined target cell is the neighbor cell of the serving cell where the user terminal is located, if the user terminal does not store the second resource configuration information of the neighbor cell, send the reestablishment request to the target cell, such that when receiving the reestablishment request, the target cell initiates the reestablishment process to recover the common service or both of the common service and the trunking speaking user service, and re-access as the trunking listening user.

8. The user terminal according to claim 7, wherein the reestablishment module is further arranged to:
monitor a trunking paging channel to obtain the trunking paging issued by the network side and comprising the TRNTI, and configure the physical layer of the user terminal by using the TRNTI;

perform a blind detection by using the TRNTI, and monitor a trunking group control channel to obtain third resource configuration information of the target cell and fourth resource configuration information of the neighbor cell of the target cell issued by the network side; and configure the PHY entity, the MAC entity, the RLC entity and the PDCP entity of the user terminal according to the third resource configuration information to allow re-access of the user terminal serving as the trunking listening user, and store the fourth resource configuration information in the storage unit of the user terminal.

* * * * *